(12) United States Patent
Takanezawa

(10) Patent No.: US 8,948,570 B2
(45) Date of Patent: Feb. 3, 2015

(54) VIDEO DISPLAY SYSTEM, VIDEO DISPLAY METHOD, AND COMPUTER-READABLE MEDIUM

(75) Inventor: Tetsuhiro Takanezawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1524 days.

(21) Appl. No.: 11/939,863

(22) Filed: Nov. 14, 2007

(65) Prior Publication Data

US 2008/0131092 A1    Jun. 5, 2008

(30) Foreign Application Priority Data

Dec. 5, 2006    (JP) .................................. 2006-328701

(51) Int. Cl.
*H04N 5/341* (2011.01)
*H04N 5/76* (2006.01)
*G08B 13/196* (2006.01)
*H04N 7/18* (2006.01)

(52) U.S. Cl.
CPC ............ *H04N 5/76* (2013.01); *G08B 13/19669* (2013.01); *G08B 13/19671* (2013.01); *H04N 7/188* (2013.01)
USPC ............ 386/239; 386/241; 248/143; 248/152

(58) Field of Classification Search
USPC ........................................................ 386/241
See application file for complete search history.

(56) References Cited

U.S. PATENT DOCUMENTS

| | | | | |
|---|---|---|---|---|
| 5,550,581 A * | 8/1996 | Zhou | ........................... | 348/14.12 |
| 5,990,930 A * | 11/1999 | Shibata | ....................... | 348/14.03 |
| 6,215,519 B1 * | 4/2001 | Nayar et al. | ................... | 348/159 |
| 6,580,466 B2 * | 6/2003 | Siefken | .......................... | 348/700 |
| 6,903,765 B1 * | 6/2005 | Takagi et al. | .............. | 348/211.4 |
| 7,236,609 B1 * | 6/2007 | Tsangaris et al. | ............. | 381/417 |
| 7,260,241 B2 * | 8/2007 | Fukuhara et al. | ............. | 382/103 |
| 7,292,264 B2 * | 11/2007 | Itokawa | ........................ | 348/143 |

(Continued)

FOREIGN PATENT DOCUMENTS

| | | |
|---|---|---|
| JP | 2000-132673 | 5/2000 |
| JP | 2002-314984 A | 10/2002 |

(Continued)

OTHER PUBLICATIONS

Mar. 8, 2011 Japanese Office Action, which is enclosed without an English Translation, that issued in Japanese Patent Application No. 2006-328701.

(Continued)

*Primary Examiner* — Peter Poltorak

(74) *Attorney, Agent, or Firm* — Cowan, Liebowitz & Latman, P.C.

(57) ABSTRACT

An image capturing system that records on a video recording unit a video captured by an image capturing apparatus and displays the video thus captured on a display unit comprises a change recording unit that records information of the time when, and the region where, a change of status occurs when the change detection unit detects such a change of status, and an extraction unit that extracts a partial region of video from the video thus recorded for displaying on the display unit. The extraction unit switches the video that is displayed on the display unit by extracting a video of the region of the change of status when the imaging time of the video that is displayed on the display unit reaches a time before a time prior to change that is preset, from the time when the change of status occurs.

14 Claims, 11 Drawing Sheets

(56) References Cited

U.S. PATENT DOCUMENTS

| | | | |
|---|---|---|---|
| 2001/0003468 A1* | 6/2001 | Hampapur et al. | 348/700 |
| 2001/0055463 A1* | 12/2001 | Armengaud | 386/46 |
| 2002/0026640 A1* | 2/2002 | Graan | 725/88 |
| 2002/0051059 A1* | 5/2002 | Shimizu et al. | 348/153 |
| 2002/0118952 A1* | 8/2002 | Nakajima et al. | 386/69 |
| 2002/0175997 A1* | 11/2002 | Takata et al. | 348/143 |
| 2003/0044168 A1* | 3/2003 | Matsukawa | 386/117 |
| 2003/0126599 A1* | 7/2003 | Novak et al. | 725/32 |
| 2004/0128402 A1* | 7/2004 | Weaver et al. | 710/1 |
| 2005/0019007 A1* | 1/2005 | Kato et al. | 386/69 |
| 2005/0104994 A1* | 5/2005 | Morimoto | 348/345 |
| 2005/0134685 A1* | 6/2005 | Egnal et al. | 348/157 |
| 2005/0232574 A1* | 10/2005 | Kawai | 386/46 |
| 2006/0152636 A1* | 7/2006 | Matsukawa et al. | 348/715 |
| 2006/0197839 A1* | 9/2006 | Senior et al. | 348/169 |
| 2006/0255986 A1* | 11/2006 | Takanezawa et al. | 341/67 |
| 2006/0279628 A1* | 12/2006 | Fleming | 348/143 |
| 2007/0010998 A1* | 1/2007 | Radhakrishnan et al. | 704/211 |
| 2007/0097460 A1* | 5/2007 | Kawai | 358/500 |
| 2007/0185989 A1* | 8/2007 | Corbett et al. | 709/224 |
| 2007/0236570 A1* | 10/2007 | Sun et al. | 348/159 |
| 2008/0019610 A1* | 1/2008 | Matsuzaka et al. | 382/284 |
| 2008/0131092 A1* | 6/2008 | Takanezawa | 386/124 |
| 2008/0304808 A1* | 12/2008 | Newell et al. | 386/52 |
| 2009/0128631 A1* | 5/2009 | Ortiz | 348/159 |
| 2009/0238542 A1* | 9/2009 | Adiletta et al. | 386/117 |

FOREIGN PATENT DOCUMENTS

| | | |
|---|---|---|
| JP | 2005-167925 A | 6/2005 |
| JP | 2006-295846 A | 10/2006 |

OTHER PUBLICATIONS

May 17, 2011 Japanese Office Action, which is enclosed without English Translation, that issued in Japanese Patent Application No. 2006-328701.

* cited by examiner

FIG. 3

| CAMERA ID | SENSOR ID | TIME | STATUS | POSITION | SIZE |
|---|---|---|---|---|---|
| 2 | 1 | 2005/03/15 09:03:40.159 | 1 | (10, 10) | 640×480 |
| 5 | 2 | 2005/03/15 09:05:05.234 | 1 | (670, 10) | 320×240 |
| 5 | 2 | 2005/03/15 09:07:10.223 | 0 | (670, 260) | 320×240 |
| 2 | 1 | 2005/03/15 09:15:45.876 | 0 | (10, 500) | 160×120 |
| 30 | 1 | 2005/03/15 09:31:39.523 | 1 | (150, 500) | 160×120 |

VIDEO DISPLAY SYSTEM, VIDEO DISPLAY METHOD, AND COMPUTER-READABLE MEDIUM

BACKGROUND OF THE INVENTION

1. Field of the Invention

The present invention relates to a video display system, a video display method, and a computer-readable medium, for example, for extracting a portion of a region of a video from a video obtained from a camera apparatus, and displaying the extracted video segment on a terminal device that is on a network. The present invention is particularly suitable for use in displaying the video region when a change of status occurs in a vicinity of the camera apparatus.

2. Description of the Related Art

A network camera system exists that uses an Internet technology to display a video, on a terminal device such as a personal computer, that is imaged by a camera in real time, via a network, while controlling, via the terminal device, an imaging angle of the camera.

A conventional monitoring system would have a preset imaging angle, and would automatically change the imaging angle to another angle in response to a sensor being triggered.

An image delivery system that uses a wide-angle image exists wherein a user is able to switch to viewing an extraction position within the wide-angle image, when the wide-angle image is imaged in a pre-arranged condition that is good for such an imaging purpose, such as a tourist site; refer to Japanese Patent Laid-Open No. 2000-132673.

A method such as the conventional monitoring system, however, which changes the imaging direction of the camera when recording in response to the sensor being triggered, is only capable of verifying the video from the sensor being triggered when verifying the recorded video in playback. Consequently, it has not been possible to verify a video of the region wherein the sensor is triggered prior to the sensor being triggered.

SUMMARY OF THE INVENTION

According to an embodiment of the present invention, an imaging system is offered that allows verifying a video of image wherein a change of status occurs prior to the change of status when verifying the recorded video in playback.

According to one aspect of the present invention, there is provided a video displaying system adapted to display a video obtained from a camera apparatus on a terminal device, the system comprising:

a video recording unit adapted to record the video obtained from the camera apparatus and an imaging time of the camera apparatus;

a change recording unit adapted to record information on a time when a change of status occurs and a region of a change of status within the video obtained from the camera apparatus;

an extraction unit adapted to extract a video in the region of a change of status from the video recorded on the recording unit; and a display unit adapted to display the video in the region of a change of status extracted from the recorded video on the terminal device, when the imaging time of the video played back on the terminal device reaches a preset time prior to change.

Also, according to another aspect of the present invention, there is provided a video display method adapted to extract and display a video of a partial region obtained from a camera apparatus on a display unit, the video display method comprising the steps of:

recording the video obtained from the camera apparatus, and an imaging time of the camera apparatus, on a video recording unit;

recording on a change recording unit, when a change of status is detected in a vicinity of the camera apparatus, information on a time when a change of status occurs and a region of the change of status within the video obtained from the camera apparatus;

extracting a video in the region of a change of status from the video recorded on the recording unit; and displaying the video in the region of a change of status extracted from the recorded video on the terminal device, when the imaging time of the video played back on the terminal device reaches a preset time prior to change.

Furthermore, according to another aspect of the present invention, there is provided a terminal device for displaying a video obtained from a camera apparatus, comprising:

a reception unit adapted to receive a video recorded on a video recording unit; and a processing unit adapted to process a display of the video in the region of a change of status extracted from the recorded video on the terminal device, when the imaging time of the video played back reaches a preset time prior to the change.

Further features of the present invention will become apparent from the following description of exemplary embodiments, with reference to the attached drawings.

BRIEF DESCRIPTION OF THE DRAWINGS

FIG. 3 depicts an example of a change of status information item that is recorded in either a change recording unit or a temporary change storage unit of the network camera system according to the first embodiment of the present invention.

DESCRIPTION OF THE EMBODIMENTS

Preferred embodiments of the present invention will now be described in detail, with reference to the accompanying drawings.

First Embodiment

Figure 1:
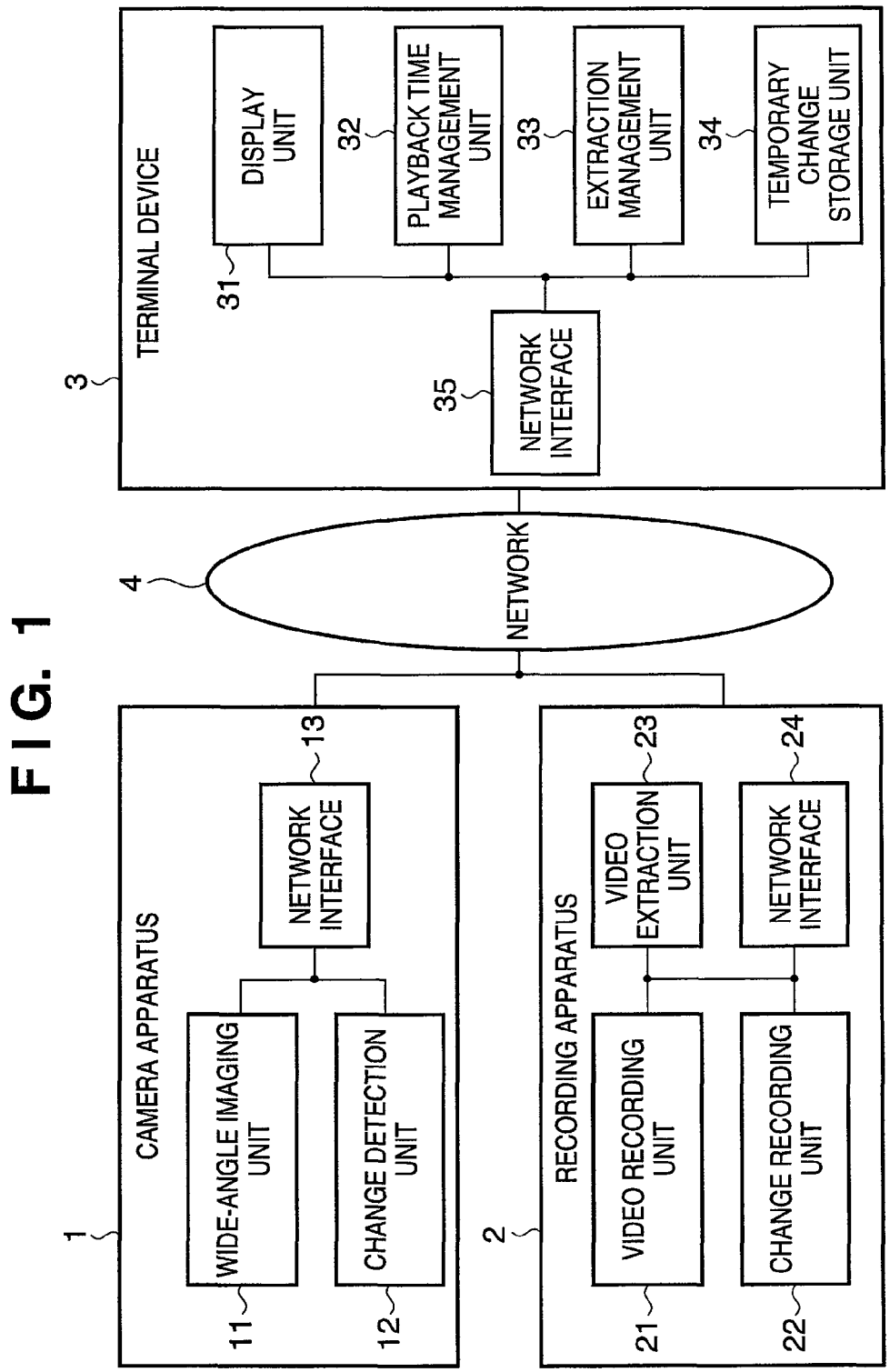
FIG. 1 depicts a configuration of a network camera system according to a first embodiment of the present invention.

Following is a description of a network camera system according to a first embodiment of the present invention, with reference to the accompanying drawings. FIG. 1 depicts an overall configuration of the network camera system. The network camera system is configured of a camera apparatus 1, which is either a camera with a wide-angle imaging assembly or an omnidirectional imaging camera, a recording apparatus 2, and a terminal device 3, which are connected via a network 4. While only one camera apparatus is depicted in FIG. 1, it would be permissible to connect a plurality of camera apparatuses instead.

The camera apparatus 1 comprises a wide-angle imaging unit 11, a change detection unit 12, and a network interface 13.

The wide-angle imaging unit 11 uses such as a wide-angle imaging assembly and a rotating mirror to capture an image over a wide-angle area.

The change detection unit 12 is configured, at a minimum, of any of a person sensor, a light sensor, an audio sensor, a temperature sensor, and a video analysis unit that analyzes a wide-angle video that is imaged by the wide-angle imaging unit 11 and detects such as a human figure, a face, or a color. The change detection unit 12 detects a change of status in a vicinity of the camera apparatus 1, computes a position and a size of a region wherein the change of status occurs (hereinafter "region of change of status" or "change of status region"), and notifies a change recording unit 22 of the recording apparatus 2. While only one change detection unit 12 is depicted in FIG. 1, it would be permissible to install a plurality of the change detection unit 12 for a single camera apparatus 1 instead. If the change detection unit 12 cannot compute the position or the size of the region of change of status, for example, if the change detection unit 12 does not include the video analysis unit, it would be permissible to preset the region for each respective change detection unit 12 and treat the preset region as the region of change of status.

The network interface 13 is for allowing the camera apparatus 1 to perform a communication with the recording apparatus 2 or the terminal device 3 via the network 4.

The recording apparatus 2 comprises a video recording unit 21, a change recording unit 22, a video extraction unit 23, and a network interface 24.

The video recording unit 21 records the wide-angle image that is imaged with the wide-angle imaging unit 11 of the camera apparatus 1 and a time whereat the video was imaged.

The change recording unit 22 records information on a time when the change of status occurs and the region of change of status, when the change of status is detected by the change detection unit 12 of the camera apparatus 1. When the change of status is detected by the change detection unit 12 of the camera apparatus 1, the change detection unit 12 computes the position and the size of the region of change of status, and transmits the result to the change recording unit 22. Upon receipt of the information, the change recording unit 22 records the time of the receipt of the information as the time when the change of status occurs, and records the position and the size of the region of change of status.

Upon receipt of a command from an extraction management unit 33 of the terminal device 3, the video extraction unit 23 extracts a portion of a region from the wide-angle video that is recorded by the video recording unit 21 and transmits the result to the terminal device 3.

The network interface 24 is for allowing the recording apparatus 2 to perform a communication with the camera apparatus 1 or the terminal device 3 via the network 4.

The terminal device 3 comprises a display unit 31, a playback time management unit 32, the extraction management unit 33, a temporary change storage unit 34, and a network interface 35.

The display unit 31 displays the video that is transmitted from the recording apparatus 2.

The playback time management unit 32 manages such as a time of imaging the video that is displayed on the display unit 31. In particular, when the video is displayed on the display unit 31, the playback time management unit 32 transmits a time that the user specifies to the video recording unit 21 of the recording apparatus 2 in order to request the recording apparatus 2 to transmit the video of the specified time. Also, the playback time management unit 32 identifies the time of the imaging of the video that is displayed on the display unit 31. The network camera system according to the embodiment switches the video that is displayed to the video of the extracted region of the change of status when the time of the imaging of the video being displayed approaches the time when the change of status occurs. A detailed description thereof will be provided hereinafter. The playback time management unit 32 stores a time prior to change, which determines how close the time of the imaging of the video should get to the time when the change of status occurs before switching the video. It would be permissible to preset the time prior to change, as well as to allow the user to set or change the time prior to change at will.

The extraction management unit 33 manages the extraction region of the video that is displayed on the image unit 31. In particular, when the video is displayed on the display unit 31, the video extraction unit 23 of the recording apparatus 2 is commanded to extract the region that the user specifies. The video extraction unit 23 of the recording apparatus 2 is commanded to extract the region of the change of status when the time of the imaging of the video being displayed approaches the time when the change of status occurs.

The temporary change storage unit 34 acquires, and temporarily stores, the change of status information that is stored in the change recording unit 22, that is, the time when the change of status occurs and the region of the change of status. The playback time management unit 32 and the extraction management unit 33 acquire the change of status information from the temporary change storage unit 34. The playback time management unit 32 notifies a time to the extraction management unit 33 so as to display the video of the region of the change of status at the time prior to change. Upon receipt of the notification thereof, the extraction management unit 33 so commands the video extraction unit 23 of the recording apparatus 2.

The network interface 35 is for allowing the terminal device 3 to perform a communication with the camera apparatus 1 or the recording apparatus 2 via the network 4.

Figure 2B:
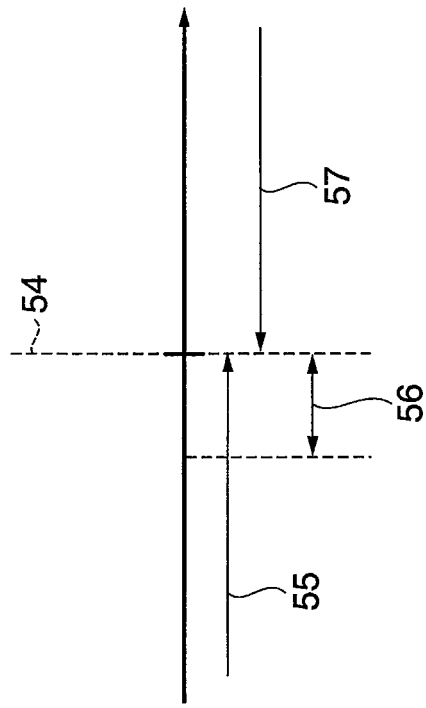
FIGS. 2A and 2B describe a video display state with regard to a terminal device of the network camera system according to the first embodiment of the present invention.
Figure 2A:
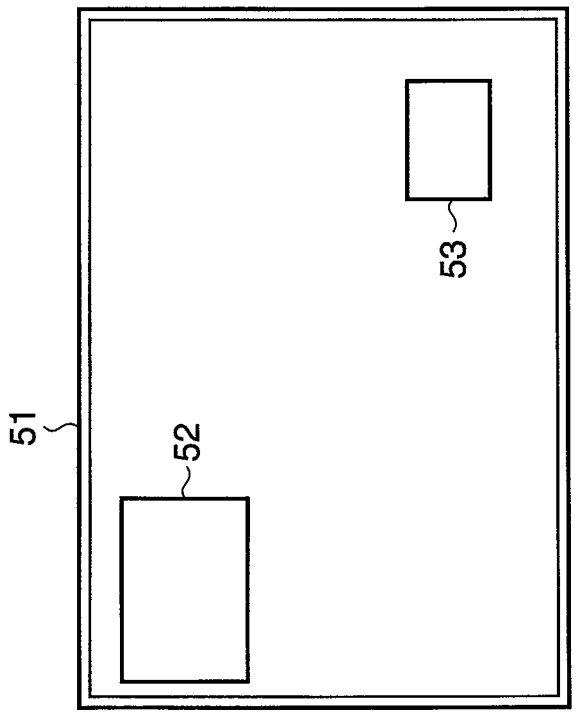

Following is a description of a video that is displayed on the display unit 31 with regard to the network camera system according to the embodiment, with reference to FIGS. 2A and 2B. FIG. 2A depicts the video region. A wide-angle imaging region 51 is a total region that can be image captured with the wide-angle imaging unit 11, a display region 52 is a region that the user of the terminal device 3 commands, and a region of a change of status 53 is the region of the change of status that is detected by the change detection unit 12.

FIG. 2B depicts a playback time of the video and a time when the change of status occurs on a time line. A time when the change of status occurs 54 is a time when the change of status that is detected by the change detection unit 12 occurs. A usual period 55 is a period wherein no change of status is detected, and a change period 57 is a period wherein the change of status is detected. A time prior to change 56 is a time that determines how close the time of the imaging of the video should get to the time when the change of status occurs before switching the video.

When the video is displayed on the display unit 31 of the terminal device 3, the user specifies, on such as a console unit (not shown), a time whereof a verification is desired, and a desired region within the wide-angle imaging region 51 pertaining to the time whereof the verification is desired.

When the time and the region are specified, the playback time management unit 32 transmits the specified time to the video recording unit 21, and the extraction management unit 33 transmits the specified region to the video extraction unit 23, respectively. In such a circumstance, the specified region is presumed to be the display region 52 in FIG. 2A, and the specified time is presumed to be prior to the time prior to change 56 of the usual period 55 in FIG. 2B.

When the video recording unit 21 and the video extraction unit 23 receive the respective time and region information, the video of the specified time and region is transmitted to the terminal device 3. The video of the display region 52 is extracted from the wide-angle imaging region 51 and displayed on the display unit 31. The video of the extracted display region 52 is matched with a specified playback speed, such as fast forward or slow, and sent to the display unit 31, whereupon it is displayed. In such a circumstance, the time of the imaging of the video being displayed is identified by the playback time management unit 32.

The video is transmitted from the recording apparatus 2 to the terminal device 3, and the information of the time when the change of status occurs and the region of the change of status that are recorded in the change recording unit 22 are transmitted and stored in the temporary change storage unit 34. The playback time management unit 32 thus stores the time prior to change that determines how close the time of the imaging of the video should get to the time when the change of status occurs before switching the video.

When the time of the imaging of the video that is being displayed enters the time prior to change 56, the extraction management unit 33 commands the video extraction unit 23 to extract the region of the change of status 53. Consequently, the video that is displayed on the display unit 31 is switched from the display region 52 to the region of the change of status 53. The video of the region of the change of status 53 is displayed in the change period 57, which is the period wherein the change of status is detected. The video that is displayed on the display unit 31 is switched from the display region 52 to a display region that includes the region of the change of status 53. It would be permissible for the display region to be of the same size as the region of the change of status 53, or to be of a larger size than the region of the change of status 53.

FIG. 3 is an example of an item and a description thereof of a change of status information that is recorded in either the change recording unit 22 or the temporary change storage unit 34. Camera ID is a key that specifies the camera apparatus 1. If a plurality of the camera apparatus 1 are connected in the network camera system, the camera ID is used to manage the camera apparatus 1.

Sensor ID is a key that specifies the change detection unit 12 that is installed in the camera apparatus 1. If a plurality of the change detection unit 12 are installed in the camera apparatus 1, each sensor ID specifies which change detection unit 12 detects the change of status.

Time is the time when the change of status occurs and a time when the change of status ends, which is detected by the change detection unit 12. For example, the time when the change of status occurs 54 is depicted with regard to FIG. 2B. Status denotes whether the change of status has occurred or has terminated. In the present example, "1" denotes that the change of status has occurred, and "0" denotes that the change of status has terminated.

Position denotes the position of the change of status. Size denotes the size of the region of the change of status. The position and the size are the information that is computed by the change detection unit 12.

Figure 4:
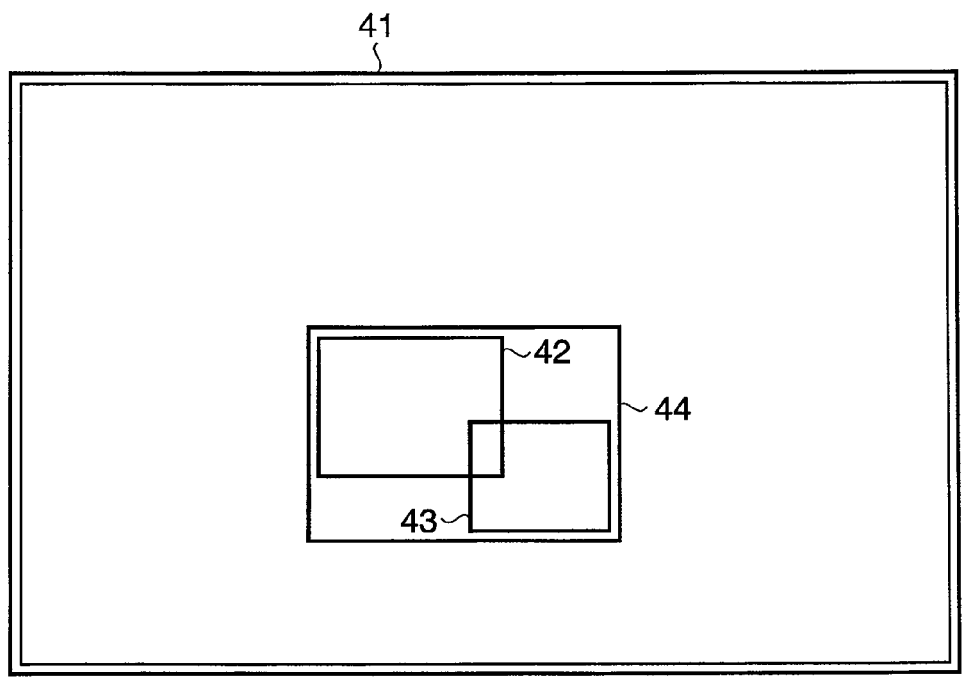
FIG. 4 describes the video display state with regard to the terminal device of the network camera system according to the first embodiment of the present invention.
Figure 5:
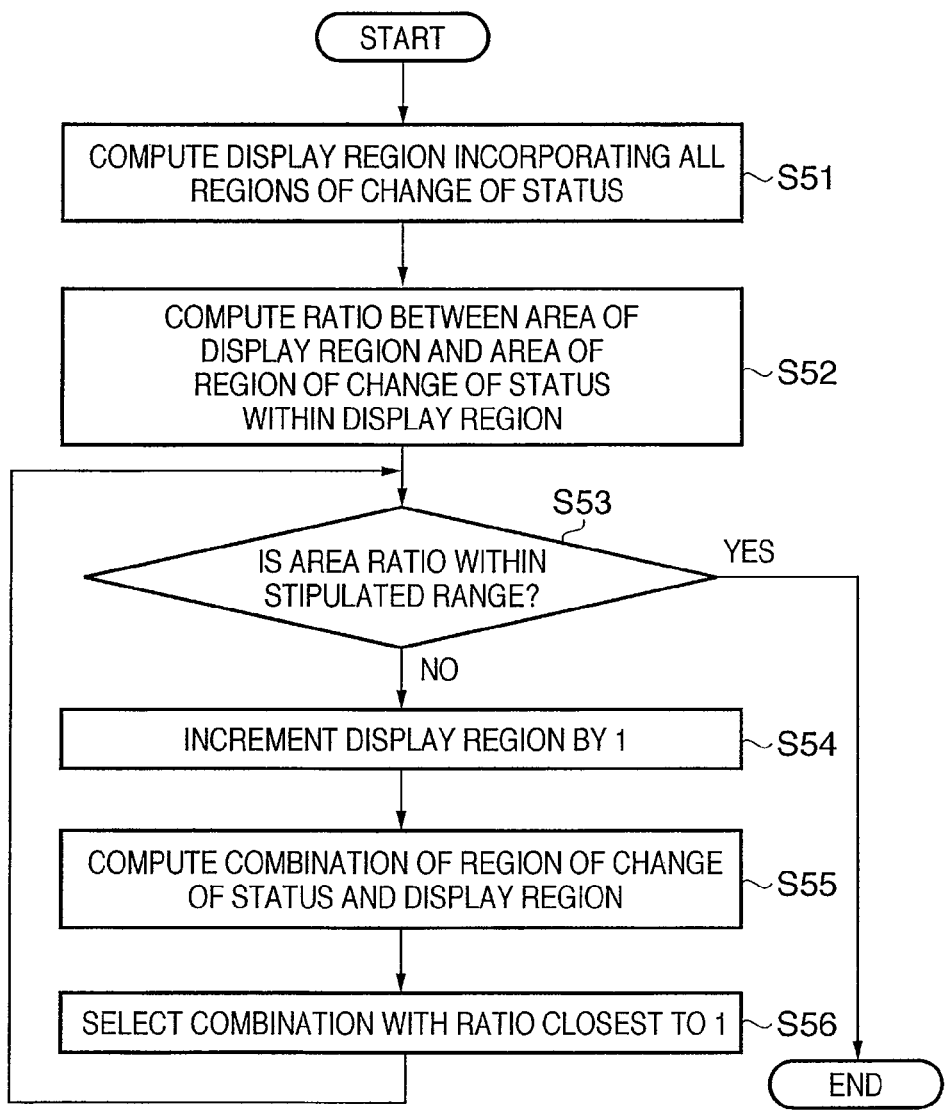
FIG. 5 is a flowchart describing a computation process of the network camera system according to the first embodiment of the present invention.

Following is a description of a circumstance wherein a plurality of changes of status occurs in a temporally overlapping manner with regard to the network camera system according to the embodiment, with reference to FIGS. 4 and 5.

In FIG. 4, a wide-angle imaging region 41 is an entire region that is capable of being imaged with the wide-angle imaging unit 11. A change of status region 42 is a region of change of status that is detected by the change detection unit 12. Similarly, a change of status region 43 is a region of a change of status that is detected by the change detection unit 12. A display region 44 is a region that incorporates both the change of status regions 42 and 43 that is computed by the extraction management unit 33.

As the plurality of changes of status occur in the temporally overlapping manner with regard to the recorded image, when the time of the imaging of the video that is being displayed enters the time prior to change, the video that is displayed on the display unit 31 is switched from the display region that the user specifies to the display region 44 that incorporates both the change of status regions 42 and 43. The display region 44 that incorporates both the change of status regions 42 and 43 are computed in the present example. The extraction management unit 33 is capable of computing an optimal display region even when more than one change of status region is present. The following is a description of the computation process.

FIG. 5 is a flowchart describing the process of computing the display region that incorporates the plurality of change of status regions. The process is an example of the process of computing the display region when the plurality of changes of status occur in the temporally overlapping manner.

In step S51, the extraction management unit 33 computes the display region that incorporates all of the change of status regions, when the plurality of change of status regions are present that are to be displayed at a given time.

In step S52, the extraction management unit 33 computes a ratio of an area of the display region that incorporates all of the change of status regions and an area of the change of status regions that are incorporated within the display region.

In step S53, the extraction management unit 33 determines whether or not the ratio of the areas of the display region and the change of status region that was derived in step S52 is within a stipulated range. If the ratio of the areas is within the stipulated range, the extraction management unit 33 extracts and displays the display region that incorporates all of the change of status regions. If the ratio of the areas is not within the stipulated range, the process proceeds to step S54, wherein the extraction management unit 33 increments the display region by one.

In step S55, the extraction management unit 33 computes all combinations of the plurality of change of status regions and the plurality of display regions.

In step S56, the extraction management unit 33 computes an area ratio of the display region and the change of status region for each respective combination that is computed in step S55, selects the combination with the ratio that is closest to 1, and returns to step S53.

In step S53, the extraction management unit 33 determines whether or not the ratio of the areas of the display region and the change of status region in the combination that was selected in step S56 is within the stipulated range. If the ratio of the areas is within the stipulated range, the extraction management unit 33 extracts and displays the display region that incorporates all of the change of status regions on the display unit 31. If the ratio of the areas is not within the stipulated range, the process proceeds to step S54, wherein the extraction management unit 33 increments the display region by one.

As a result, a set of combinations corresponding to display regions is computed such that all of the change of status regions belong to any one of the combinations respectively, each of the display regions has the ratio of the areas within the stipulated range, and the number of display regions is small. Then, the display regions are extracted.

When the extraction management unit 33 detects, from the information from the temporary change storage unit 34, that the change of status regions increases, decreases, moves, enlarges, or reduces, the above process is performed.

Figure 6:
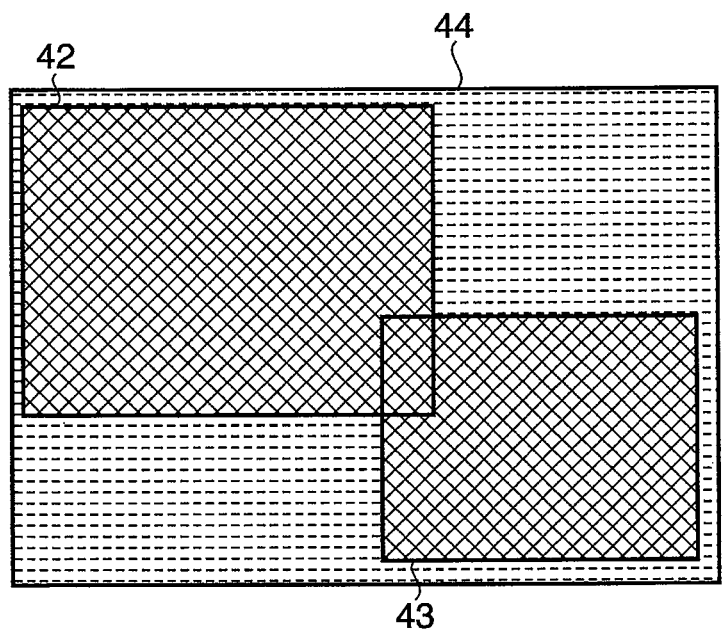
FIG. 6 describes the computation process of the network camera system according to the first embodiment of the present invention.

FIG. 6 depicts an example of the process of computing the area ratio that is performed in the flowchart in FIG. 5.

The ratio of the area of the display region 44 and the area that is occupied with both the change of status region 42 and 43 that is incorporated in the display region 44 is computed, and if the ratio of the areas is within the stipulated range, the display region 44 is extracted and displayed. If the ratio of the areas is not within the stipulated range, the display region is increased and the combination that is within the stipulated range is computed.

Figure 7A:
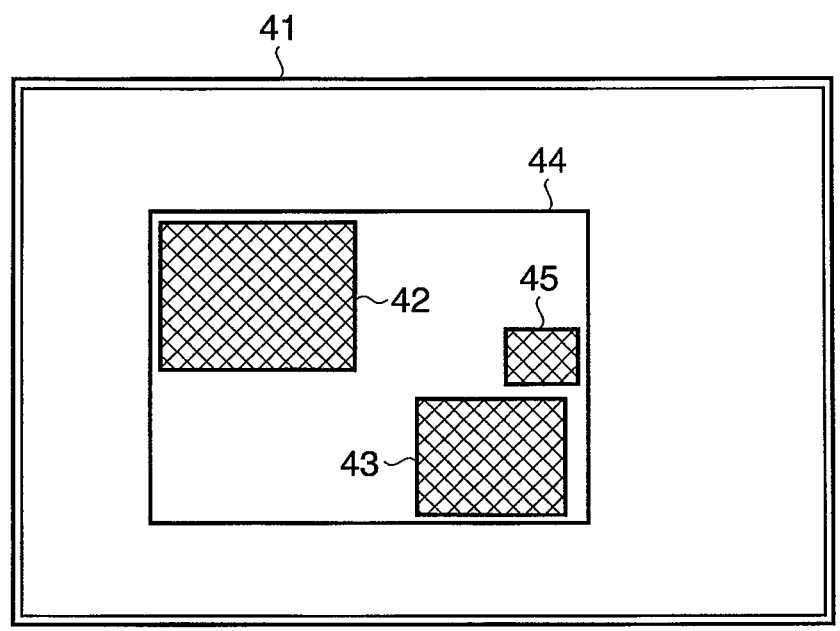
FIGS. 7A and 7B describe the computation process of the network camera system according to the first embodiment of the present invention.
Figure 7B:
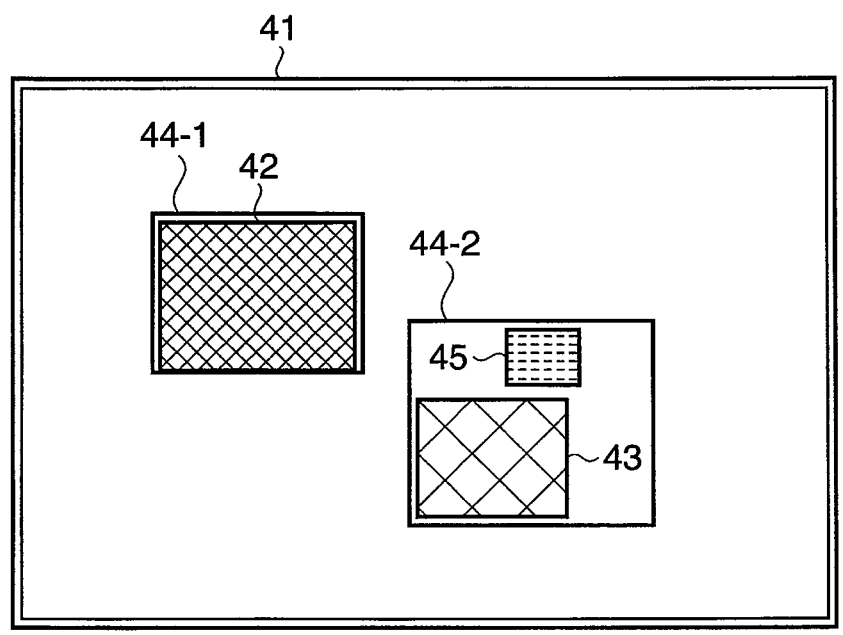

FIGS. 7A and 7B depict another example of the process of computing the area ratio that is performed in the flowchart in FIG. 5. The display region 44 is depicted in FIG. 7A incorporates the change of status region 42, the change of status region 43, and a change of status region 45. In the present circumstance, a priority is assigned to the change of status depending on the location of the installation of the camera apparatus 1, the type of the change detection unit 12, and the combination thereof. In FIG. 7A, it is presumed that the change of status region 42 is assigned a priority of 1, the change of status region 43 is assigned a priority of 2, and the change of status region 45 is assigned a priority of 3, with 1 being the highest priority, followed in order by 2 and 3. When computing the area of the change of status region, a weight is assigned in order of priority. For example, it is presumed that the priority of 1 receives a weight of 1, the priority of 2 receives a weight of 0.5, and the priority of 3 receives a weight of 0.3. A method of computing the area of the change of status region is to compute, in descending order of priority, an area of a region that is the change of status region and does not overlap with a region with a higher priority, and a product of the weight values, and to treat a sum thereof as the area of the change of status region. The area ratio of the display region 44 and the sum of the change of status region is computed. If, as a result thereof, the ratio of the areas is within the stipulated range, the display region 44 is extracted and displayed. If the ratio of the areas is not within the stipulated range, the display region is increased and the combination that is within the stipulated range is computed. If the ratio of the areas is within the stipulated range, the display region 44 that is depicted in FIG. 7A will be displayed. If, on the other hand, the ratio of the areas is not within the stipulated range, then, as depicted in FIG. 7B, for example, the display region is incremented by one, the change of status region 42, with the high priority, will be displayed in a display region 44-1, and the change of status region 43 and the change of status region 45, with the lower priority, will be displayed together in a display region 44-2.

Whereas the number of display regions is increased from one to two in the example in FIG. 7B, the change of status region increases versus a given display region, simplifying a verification thereof by the user.

Setting the weight according to the priority thus allows changing a setting as usage, such as computing the combination that makes a larger display the change of status region with the high priority versus the display region.

Only a vicinity before or after the time when the change of status occurs 54 is described according to the embodiment; refer to FIG. 2B. Following is a description of a vicinity before or after a time when the change of status terminates 58, with reference to FIG. 8. The time when the change of status terminates 58 is a time when the change of status that is detected by the change detection unit 12 terminates. A time after change 59 is a time after the termination of the change of status wherein the change of status region continues to be displayed.

Figure 8:
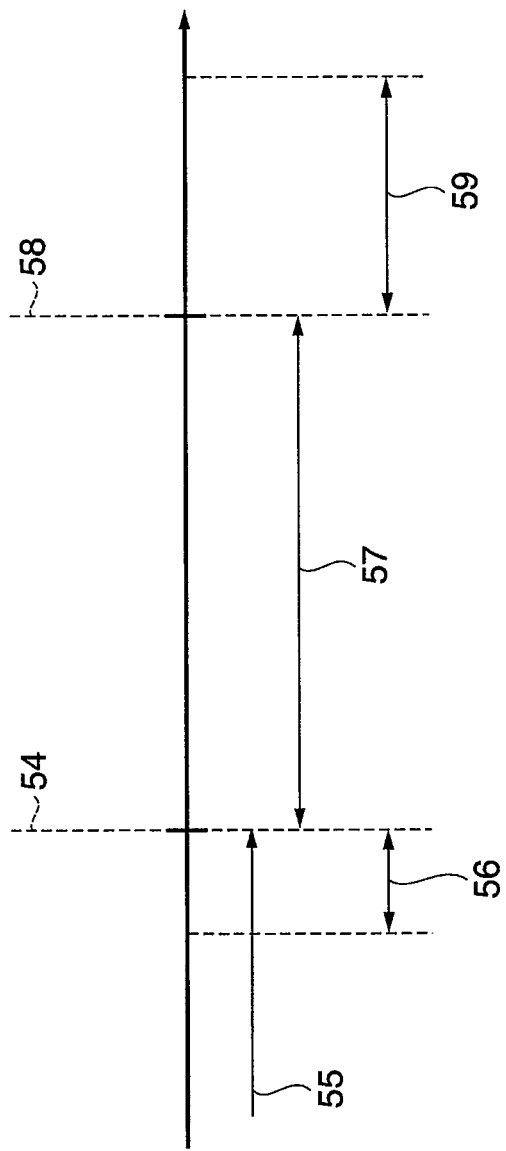
FIG. 8 describes the video display state with regard to the terminal device of the network camera system according to the first embodiment of the present invention.

While it would be permissible to display a specified region that is displayed prior to the time prior to change 56, simultaneously with the time when the change of status terminates 58, the change of status region continues to be displayed for a given interval, that is, the time after change 59, after the time when the change of status terminates 58, according to the embodiment. In FIG. 8, the time wherein the change of status region, or the display region that incorporates the change of status region, such as is described in FIG. 4, is displayed, is the time prior to change 56, the change period 57, and the time after change 59. Once the time after change 59 has elapsed, the specified region that was displayed prior to the time prior to change 56 is displayed.

A video display state is described in the present circumstance wherein another change of status occurs in a different region after a given change of status terminates, with regard to the recorded video. The description thus far is of an example wherein the specified region that was displayed prior to the time prior to change 56 is displayed after the time wherein the change of status region, or the display region that incorporates the change of status region, such as is described in FIG. 4, is displayed, has elapsed. It would be permissible to allow a video display state other than the video display state thus described, wherein the change of status region, or the display region that incorporates the change of status region, such as is described in FIG. 4, is displayed smoothly, in sequence, when another change of status occurs in a different region after a given change of status terminates. Following is a description of the video display state thereof, with reference to FIGS. 9A and 9B, and FIGS. 10A and 10B.

Figure 9A:
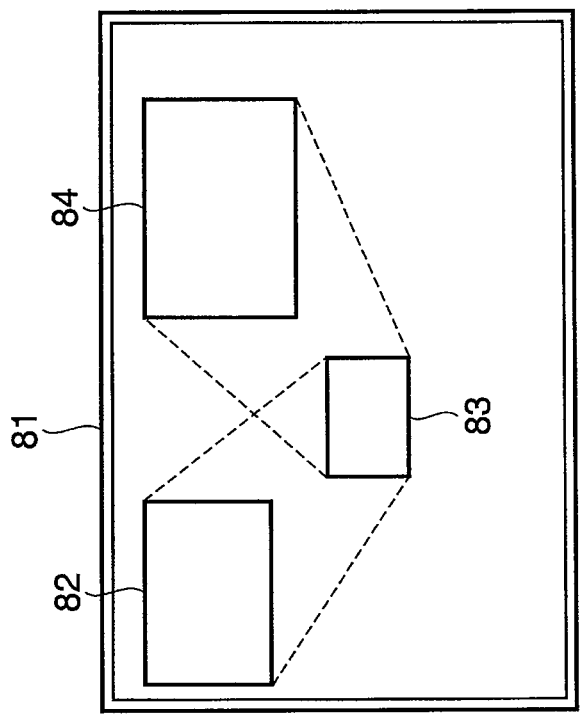
FIGS. 9A and 9B describe the video display state with regard to the terminal device of the network camera system according to the first embodiment of the present invention.
Figure 9B:
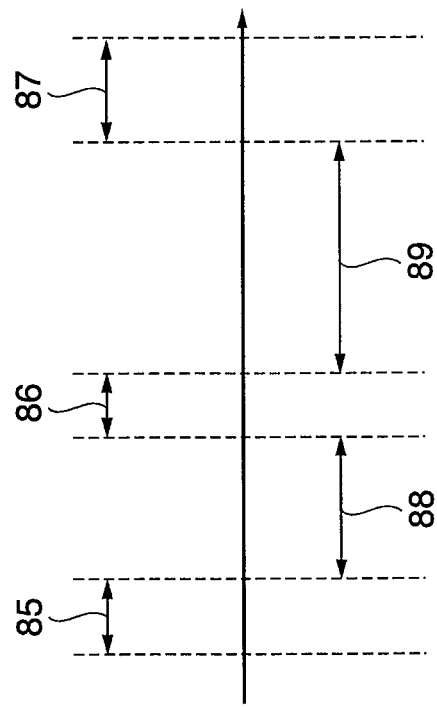

Following is a description of an example of a video display state, with reference to FIGS. 9A and 9B. FIGS. 9A and 9B depict an example of a video display state wherein the change of status region, or the display region that incorporates the change of status region, such as is described in FIG. 4, is displayed smoothly, in sequence, when the video recording is displayed in a playback mode. FIG. 9A depicts a region of the video, and FIG. 9B depicts a display period thereof in a time line.

In FIG. 9A, a wide-angle imaging region 81 is a region of all of the images that can be imaged with the wide-angle imaging unit 11.

A display region A82 is the change of status region, or the display region that incorporates the change of status region, such as is described in FIG. 4, and is a region that is depicted in a display period A85 that is depicted in FIG. 9B. As described in FIG. 8, the display period A85 is formed from the time prior to change 56, the change period 57, and the time after change 59.

A display region B83 is the change of status region, or the display region that incorporates the change of status region, such as is described in FIG. 4, and is displayed in a display period B86 that is depicted in FIG. 9B. The display period B86 is formed from the time prior to change 56, the change period 57, and the time after change 59, as described in FIG. 8.

A display region C84 is the change of status region, or the display region that incorporates the change of status region, such as is described in FIG. 4, and is displayed in a display period C87 that is depicted in FIG. 9B. The display period C87 is formed from the time prior to change 56, the change period 57, and the time after change 59, as described in FIG. 8.

A transition period 88 is a time between the display period A85 and the display period B86. A transition period 89 is a time between the display period B86 and the display period C87.

The display region A82 is extracted and displayed during the display period 85. In such a circumstance, a distance between a center of the display region A82 and a center of the display region B83, that is, a shortest path therebetween, and a difference between the size and a shape of the regions, is computed. A difference between an end of the display period A85 and a start of the display period B86 is computed. Then, a transition distance per time unit and a proportion of alteration per time unit, are computed based on the above computed distance and differences of size and shape. During the transition period 88, the region is thus extracted, from the display region A82, and displayed that transitions and alters in an elapsed time from a start of the transition period 88, in accordance with the per time unit transition distance and proportion of alteration that are derived as per the foregoing. The display region B83 is displayed promptly as the display period B86 commences as a result.

Similarly, a distance between a center of the display region B83 and a center of the display region C84, that is, a shortest path therebetween, and a difference between the size and a shape of the regions, is computed. A difference between an end of the display period B86 and a start of the display period C87 is computed. Then, a transition distance per time unit and a proportion of alteration per time unit, are computed based on the above computed distance and differences of size and shape. During the transition period 89, the region is thus extracted, from the display region B83, and displayed that transitions and alters in an elapsed time from a start of the transition period 89, in accordance with the per time unit transition distance and proportion of alteration that are derived as per the foregoing. The display region C84 is displayed promptly as the display period C87 commences as a result.

Figure 10B:
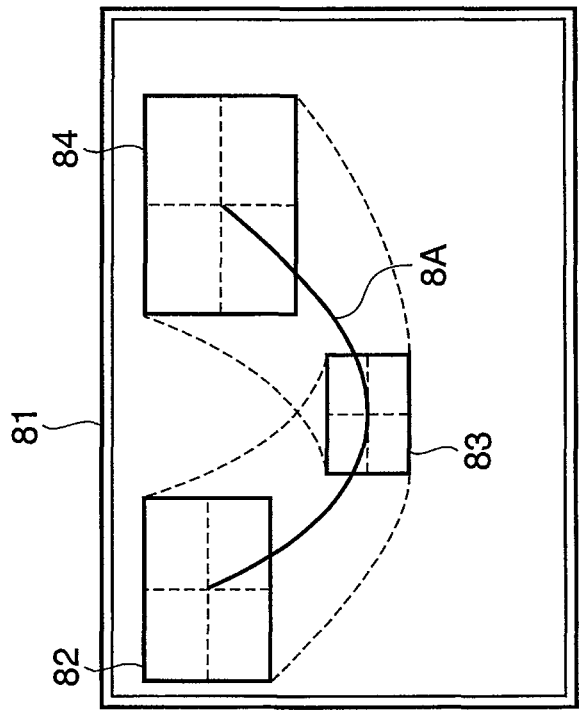
FIGS. 10A and 10B describe the video display state with regard to the terminal device of the network camera system according to the first embodiment of the present invention.
Figure 10A:
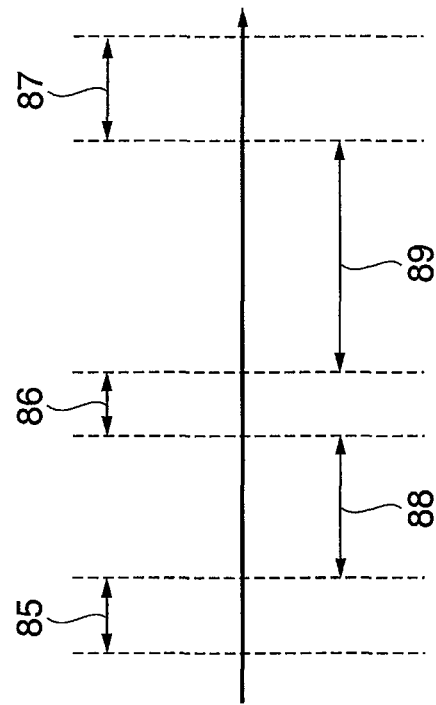

The following is a description of an example of a video display state, with reference to FIGS. 10A and 10B. FIGS. 10A and 10B depict an example of a method of displaying smoothly, in sequence, the change of status region, or the display region that incorporates the change of status region, such as is described in FIG. 4, when the video recording is displayed in a playback mode. FIG. 10A depicts the display region of the video, and FIG. 11B depicts the display period thereof in a time line.

A transition path 8A is a transition path of a region that is computed as a center of the display region B83. The path between the display region A82 and the display region B83 is derived by computing a polynomial curve that interpolates a center of each of a plurality of display regions that includes, at a minimum, the display region A82 and the display region B83. The curve thus derived is the path that joins the centers of the display region A82 and the display region B83.

Similarly, a path between the display region B83 and the display region C84 is derived by computing a polynomial curve that interpolates a center of each of a plurality of display regions that includes, at a minimum, the display region B83 and the display region C84. The curve thus derived is the path that joins the centers of the display region B83 and the display region C84.

In the figure, the display region A82 is extracted and displayed during the display period A85. In such a circumstance, a path distance between the center of the display region A82 and the center of the display region B83, and a difference between the size and a shape of the regions, are computed. A difference between an end of the display period A85 and a start of the display period B86 is computed. Then, a transition distance of the region per time unit and a proportion of alteration per time unit, are computed based on the above computation results. During the transition period 88, the region is thus extracted, from the display region A82, and displayed that transitions along a transition path A, and alters in accordance with the per time unit transition distance and proportion of alteration that are derived as per the foregoing, in an elapsed time from a start of the transition period 88. The display region B83 is displayed promptly as the display period B86 commences as a result.

Similarly, a path distance between the center of the display region B83 and the center of the display region C84, and a difference between the size and a shape of the regions, are computed. A difference between an end of the display period B86 and a start of the display period C87 is computed. Then, a transition distance of the region per time unit and a proportion of alteration per time unit, are computed based on the above computation results. During the transition period 89, the region is thus extracted, from the display region B83, and displayed that transitions along the transition path A, and alters in accordance with the per time unit transition distance and proportion of alteration that are derived as per the foregoing, in an elapsed time from a start of the transition period 89. The display region C84 is displayed promptly as the display period C87 commences as a result.

Second Embodiment

Figure 11:
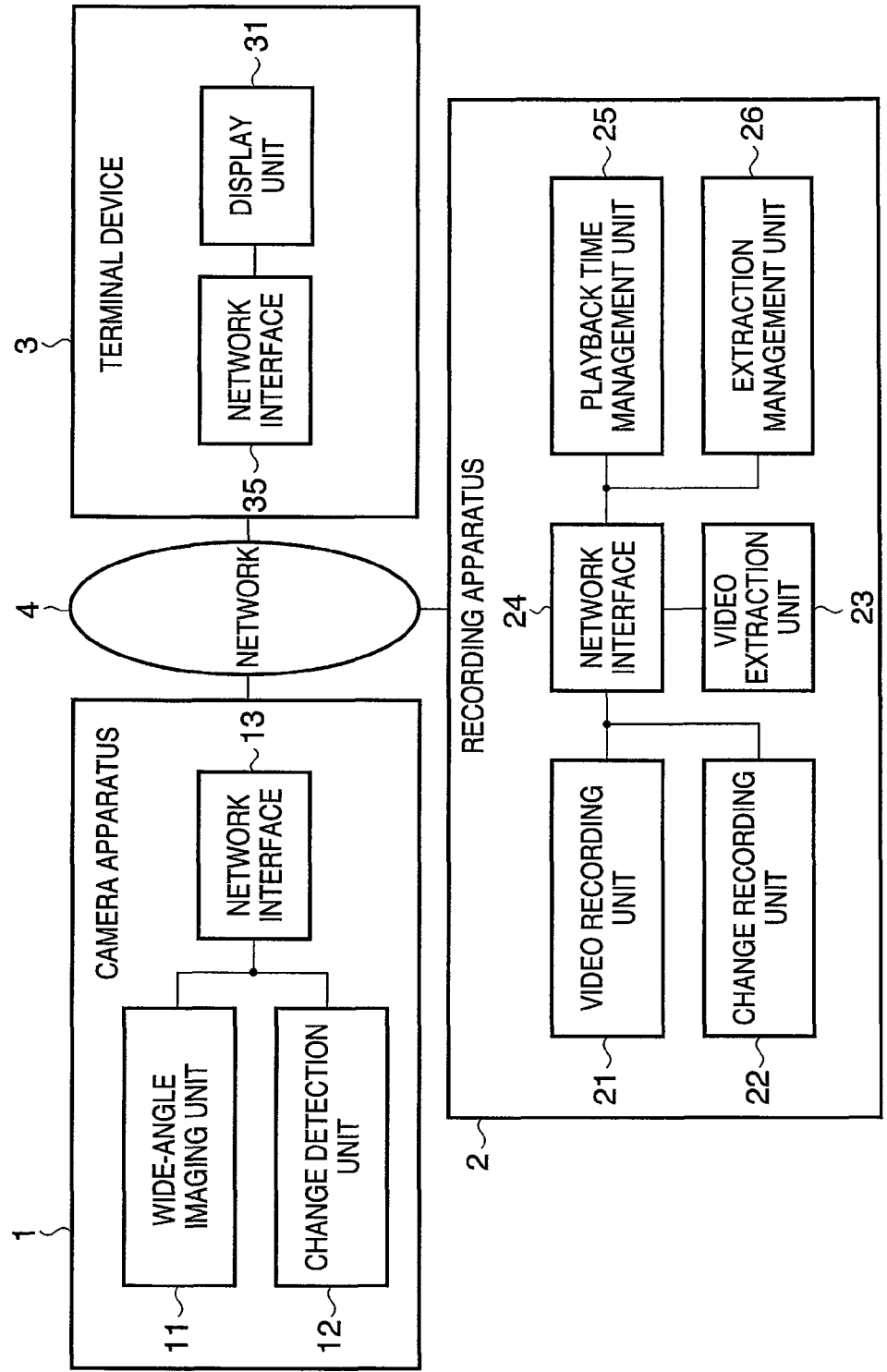
FIG. 11 depicts a configuration of a network camera system according to a second embodiment of the present invention.

Following is a description of a network camera system according to a second embodiment of the present invention, with reference to the accompanying drawings. FIG. 11 depicts an overall configuration of a network camera system. Whereas the terminal device 3 comprised the playback time management unit 32 and the extraction management unit 33 according to the first embodiment, the recording apparatus 2 comprises a playback time management unit 25 and an extraction management unit 26 according to the second embodiment. A configuration element according to the second embodiment that is shared according to the first embodiment is described with an identical reference numeral attached thereto.

The playback time management unit 25 manages such as a time of imaging the video that is displayed on the display unit 31. In particular, when the video is displayed on the display unit 31, a time that the user specifies is transmitted to the video recording unit 21 to transmit the video of the specified time. The playback time management unit 25 identifies time of the imaging of the video that is displayed on the display unit 31. As per the first embodiment, the video that is displayed is switched to the video of the extracted region of the change of status when the time of the imaging of the video being displayed approaches the time when the change of status occurs.

The extraction management unit 26 manages the extraction region of the video that is displayed on the image unit 31. In particular, when the video is displayed on the display unit 31, the video extraction unit 23 is commanded to transmit the region of the video that the user specifies. As per the first embodiment, the video extraction unit 23 of the recording apparatus 2 is commanded to extract the region of the change of status when the time of the imaging of the video being displayed approaches the time when the change of status occurs.

The video that is displayed is switched to the video of the region of the change of status when the time of the imaging of the video being displayed approaches the time when the change of status occurs, according to the respective embodiments. It is thus possible to verify the video of the region wherein the change of status occurs, before the change of status occurs.

The configuration of the network camera system according to the embodiment is not limited thereto. The state of the configuration may be altered as appropriate. For example, it would be permissible to combine the camera apparatus 1 and the recording apparatus 2 so as to function in a unitary fashion. It would be permissible to combine each unit that comprises each apparatus so as to function in a unitary fashion. For example, the temporary change storage unit 34 according to the first embodiment is combined with the change recording unit 22 according to the second embodiment. Such as combining the extraction management unit 33 and the video extraction unit 23 so as to function in a unitary fashion would also be permissible.

It would be permissible to employ a storage medium that records a program code of a software that implements the function of the embodiment as the objective of the present invention. In such a circumstance, the objective of the present invention would be achieved by supplying the storage medium to a system or an apparatus, and a computer, or a CPU or an MPU, of the system or the apparatus loading and executing the program code that is stored on the recording medium.

In such a circumstance, the program code itself that is loaded from the storage medium implements the function of the embodiment, and the program code itself and the storage medium whereupon the program code is stored configure the present invention.

As the storage medium for supplying the program code, for example, it would be possible to use such as a floppy disk, a hard drive, an optical disk, a magneto-optical (MO) disk, a CD-ROM, a CD-R, a magnetic tape, a nonvolatile memory card, or a ROM.

It is to be understood that a circumstance is incorporated wherein an operating system or other software running on the computer performs the actual processing, in whole or in part, in accordance with a command of the program code.

It would also be permissible for the program code that is loaded from the storage medium to be written to a memory that is comprised in an expansion board that is installed in the computer, or an expansion unit that is connected to the computer. In such a circumstance, it would be permissible for the CPU or other hardware that is comprised in the expansion board or the expansion unit to perform the actual processing, in whole or in part, in accordance with the command of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-328701, filed Dec. 5, 2006, which is hereby incorporated by reference herein in its entirety.

What is claimed is:

1. A video displaying system adapted to display a video on a terminal device, the system comprising:
    an acquiring unit configured to acquire a video of an extraction area based on a designation of the extraction area within a video frame by the user, wherein a plurality of video frames are recorded by a video recording unit as a recorded video;
    a first processing unit configured to perform a first control for displaying on the terminal device the video of the extraction area determined based on the designation by the user;
    a detection unit configured to detect an event within the recorded video;
    a determination unit configured to determine, in a case where a plurality of events are detected in a video frame of the recorded video, whether an area ratio of an event area including areas corresponding to the plurality of events and the areas corresponding to the plurality of events matches a predetermined ratio condition; and
    a second processing unit configured to perform a second control for switching of the video displayed on the terminal device from the video of the extraction area to (i) a video of the event area including the areas corresponding to the plurality of events in a case where the determination unit determines that the area ratio matches the predetermined ratio condition, and to (ii) videos of at least two event areas corresponding to the plurality of events in a case where the determination unit determines that the area ratio does not match the predetermined ratio condition, wherein the areas corresponding to the plurality of events are included within any of the at least two event areas, and wherein a position of the extraction area within the video frame based on the designation by the user is different from a position of the event area within a video frame of the recorded video, and wherein the extraction area and the event area are extracted from different frames of the recorded video recorded by the video recording unit.

2. The system according to claim 1, wherein:
    processing unit, in a case where a second event corresponding to a second area occurs after a first event corresponding to a first area terminates, performs a control to display a video of a display area between the first area and the second area.

3. The system according to claim 1, wherein the second processing unit determines whether a difference between a time corresponding to the video of the extraction area displayed on the terminal device and a time when the predetermined event occurs in the recorded video is smaller than a predetermined time, wherein the second control is performed in a case where the difference between the time corresponding to the video of the extraction area displayed on the terminal device and a time when the predetermined event occurs is smaller than the predetermined time.

4. A video display method adapted to display a video on a terminal device, the video display method comprising the steps of:
  acquiring a video of an extraction area based on a designation of the extraction area within a video frame by the user, wherein a plurality of video frames are recorded by a video recording unit as a recorded video;
  performing a first control for displaying on the terminal device the video of the extraction area determined based on the designation by the user;
  detecting an event within the recorded video;
  determining, in a case where a plurality of events are detected in a video frame of the recorded video, whether an area ratio of an event area including areas corresponding to the plurality of events and the areas corresponding to the plurality of events matches a predetermined ratio condition; and
  performing a second control for switching of the video displayed on the terminal device from the video of the extraction area to (i) a video of the event area including the areas corresponding to the plurality of events in a case where the determining step determines that the area ratio matches the predetermined ratio condition, and to (ii) videos of at least two event areas corresponding to the plurality of events in a case where the determining step determines that the area ratio does not match the predetermined ratio condition, wherein the areas corresponding to the plurality of events are included within any of the at least two event areas, and wherein a position of the extraction area within the video frame based on the designation by the user is different from a position of the event area within a video frame of the recorded video, and wherein the extraction area and the event area are extracted from different frames of the recorded video recorded by the video recording unit.

5. An apparatus comprising:
  an acquisition unit configured to acquire a video of an extraction area based on a designation of the extraction area within a video frame by a user, wherein a plurality of video frames are recorded by a video recording unit as a recorded video;
  a first processing unit configured to perform a first control for displaying on a display unit the video of the extraction area determined based on the designation;
  a detection unit configured to detect an event within the recorded video;
  a determination unit configured to determine, in a case where a plurality of events are detected in a video frame of the recorded video, whether an area ratio of an event area including areas corresponding to the plurality of events and the areas corresponding to the plurality of events matches a predetermined ratio condition; and
  a second processing unit configured to perform a second control for switching of the video displayed on the display unit from the video of the extraction area to (i) a video of the event area including the areas corresponding to the plurality of events in a case where the determination unit determines that the area ratio matches the predetermined ratio condition, and to (ii) videos of at least two event areas corresponding to the plurality of events in a case where the determination unit determines that the area ratio does not match the predetermined ratio condition, wherein the areas corresponding to the plurality of events are included within any of the at least two event areas, and wherein a position of the extraction area within the video frame based on the designation by the user is different from a position of the event area within a video frame of the recorded video, and wherein the extraction area and the event area are extracted from different video frames of the recorded video.

6. The apparatus according to claim 5, wherein the event is detected based on at least one of detection results of a human figure, a face, and a color detected from the plurality of video frames of the recorded video.

7. The apparatus according to claim 5, further comprising a receiving unit configured to receive signal from at least one of a person sensor, a light sensor, and an audio sensor, wherein the event is detected based on the signal received by the receiving unit.

8. The apparatus according to claim 5, wherein the second processing unit determines whether a difference between a time corresponding to the video of the extraction area displayed on the terminal device and a time when the predetermined event occurs in the recorded video is smaller than a predetermined time, wherein the second control is performed in a case where the difference between the time corresponding to the video of the extraction area displayed on the terminal device and a time when the predetermined event occurs is smaller than the predetermined time.

9. A non-transitory computer-readable medium storing a program for causing a computer to execute a method of an apparatus, the method comprising:
  acquiring a video of an extraction area based on a designation of the extraction area within a video frame by the user, wherein a plurality of video frames are recorded by a video recording unit as a recorded video;
  performing a first control for displaying on a display unit the video of the extraction area determined based on the designation;
  detecting an event within the recorded video;
  determining, in a case where a plurality of events are detected in a video frame of the recorded video, whether an area ratio of an event area including areas corresponding to the plurality of events and the areas corresponding to the plurality of events matches a predetermined ratio condition; and
  performing a second control for switching of the video displayed on the display unit from the video of the extraction area to (i) a video of the event area including the areas corresponding to the plurality of events in a case where the determining step determines that the area ratio matches the predetermined ratio condition, and to (ii) videos of at least two event areas corresponding to the plurality of events in a case where the determining step determines that the area ratio does not match the predetermined ratio condition, wherein the areas corresponding to the plurality of events are included within any of the at least two event areas, and wherein a position of the extraction area within the video frame based on the designation by the user is different from a position of the event area within a video frame of the recorded video, and wherein the extraction area and the event area are extracted from different frames of the recorded video recorded by the video recording unit.

10. The medium according to claim 9, wherein the second control is performed such that the video of the event area is requested to the video recording unit in a case where a difference between a time corresponding to the video of the extraction area displayed on the display unit and a time when the predetermined event occurs is smaller than a predetermined time.

11. The medium according to claim 9, wherein the event is detected based on at least one of detection results of a human figure, a face, and a color detected from the plurality of video frames of the recorded video.

12. The medium according to claim 9, further comprising receiving signal from at least one of a person sensor, a light sensor, and an audio sensor, wherein the event is detected based on the signal received by the receiving step.

13. The medium according to claim 9, further comprising determining whether a difference between a time corresponding to the video of the extraction area displayed on the terminal device and a time when the predetermined event occurs in the recorded video is smaller than a predetermined time, wherein the second control is performed in a case where the difference between the time corresponding to the video of the extraction area displayed on the terminal device and a time when the predetermined event occurs is smaller than the predetermined time.

14. The apparatus according to claim 5, wherein the processing unit performs the second control such that the acquisition unit requests the video of the event area in a case where a difference between a time corresponding to the video of the extraction area displayed on the display unit and a time when the predetermined event occurs within the recorded video is smaller than a predetermined time.

\* \* \* \* \*